United States Patent [19]

Luzzi et al.

[11] Patent Number: 4,520,229

[45] Date of Patent: May 28, 1985

[54] SPLICE CONNECTOR HOUSING AND ASSEMBLY OF CABLES EMPLOYING SAME

[75] Inventors: Glenn J. Luzzi, Mt. Bethel, Pa.; Andrew A. Kominiak, Flanders, N.J.

[73] Assignee: Amerace Corporation, New York, N.Y.

[21] Appl. No.: 455,325

[22] Filed: Jan. 3, 1983

[51] Int. Cl.³ .......................................... H02G 15/184
[52] U.S. Cl. .................................................... 174/73 R
[58] Field of Search .......................... 174/73 R, 73 SC

[56] References Cited

U.S. PATENT DOCUMENTS

| | | | |
|---|---|---|---|
| 3,310,623 | 3/1967 | Vaughan | 174/135 |
| 4,039,238 | 8/1977 | Johnson, Jr. et al. | 339/95 R |
| 4,079,189 | 3/1978 | Troccoli | 174/73 R |
| 4,164,620 | 8/1979 | Hervig | 174/73 R |

FOREIGN PATENT DOCUMENTS 1448679 6/1966 France .............................. 174/138 F Primary Examiner—Laramie E. Askin Attorney, Agent, or Firm—David Teschner

[57] ABSTRACT

Disclosed herein is a splice connector housing comprising a tubular elastomeric sleeve having first and second coaxial end portions which receive the insulation and shield of first and second cables, respectively, and, between the end portions, a central portion coaxial with the end portions and of substantially uniform wall thickness and which receives and resiliently grips a compression connector crimped to the bared ends of the conductors of the cables. The central portion further has a plurality of circumferentially spaced, similar radially resiliently, dilatable inner areas the inner surfaces of which define a circle normally of lesser diameter than both the cable insulation and the compression connector and a like number of circumferentially spaced similar relieved outer areas the inner surfaces of which define a circle of greater diameter than the cable shield. Each outer area merges smoothly, circumferentially, with two inner areas. Also disclosed herein is a completed splice joint of two shielded cables employing the housing.

17 Claims, 8 Drawing Figures

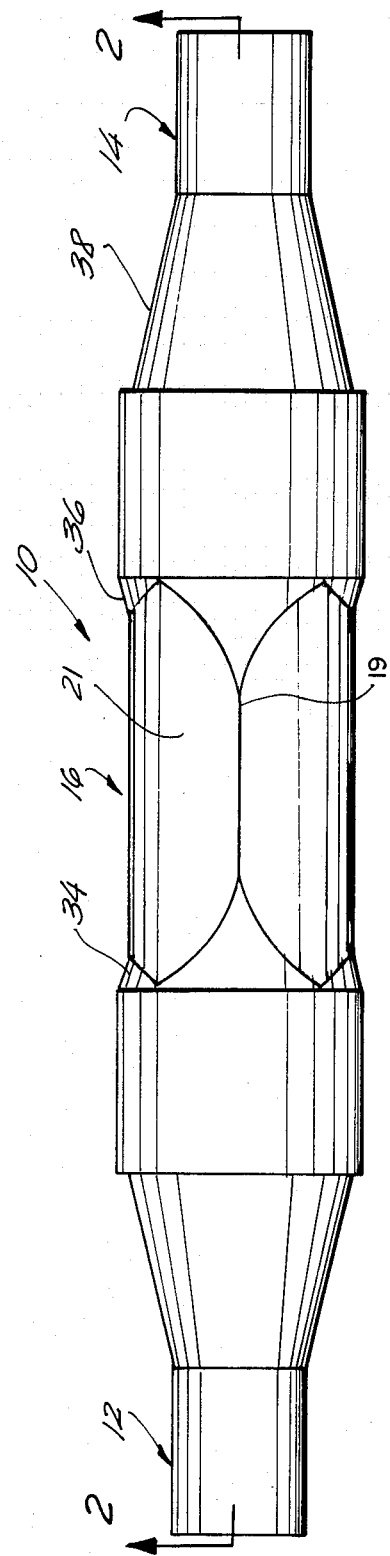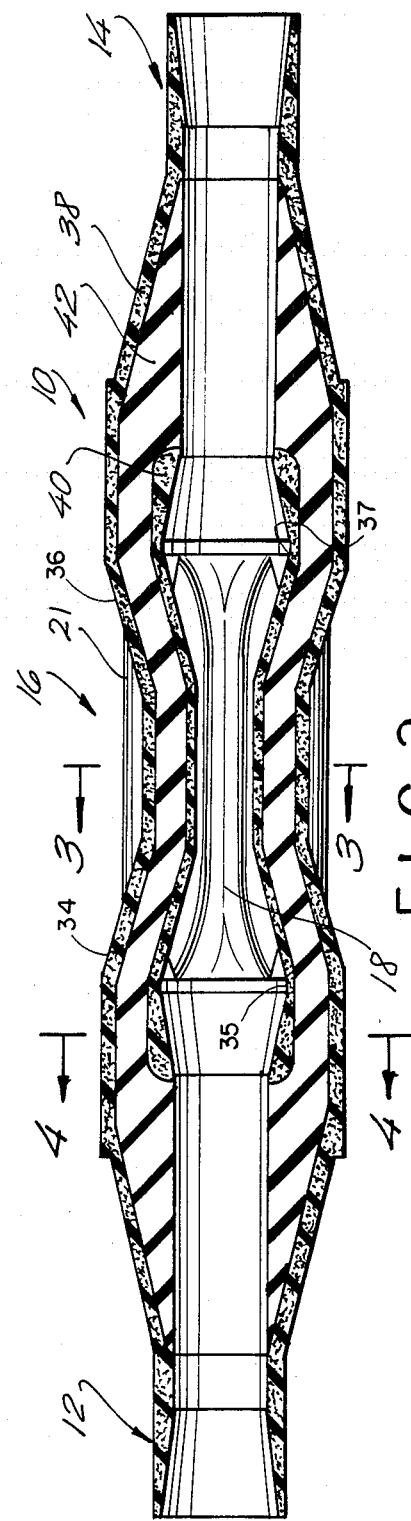

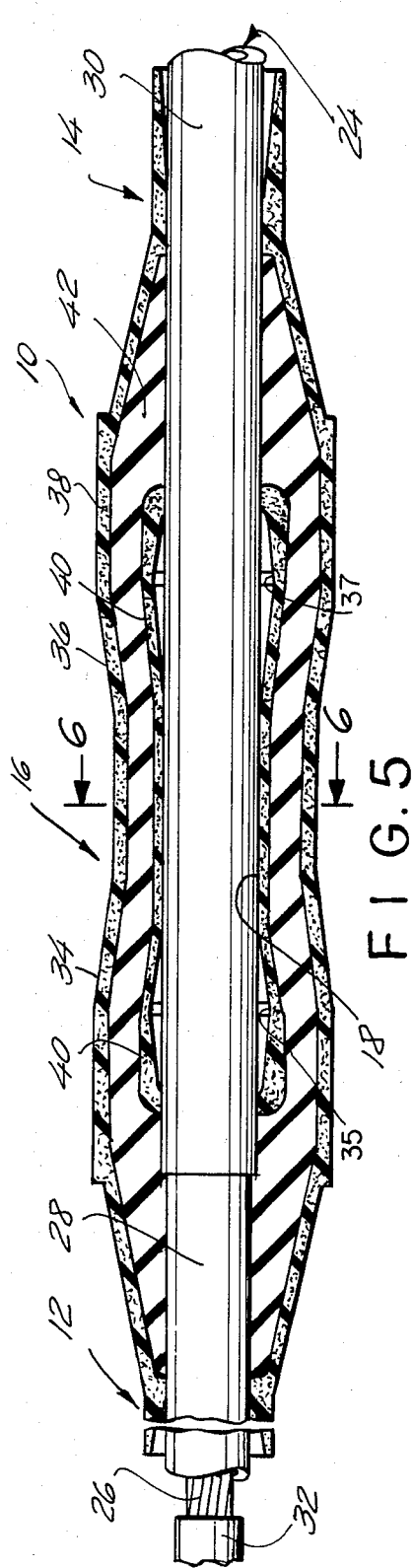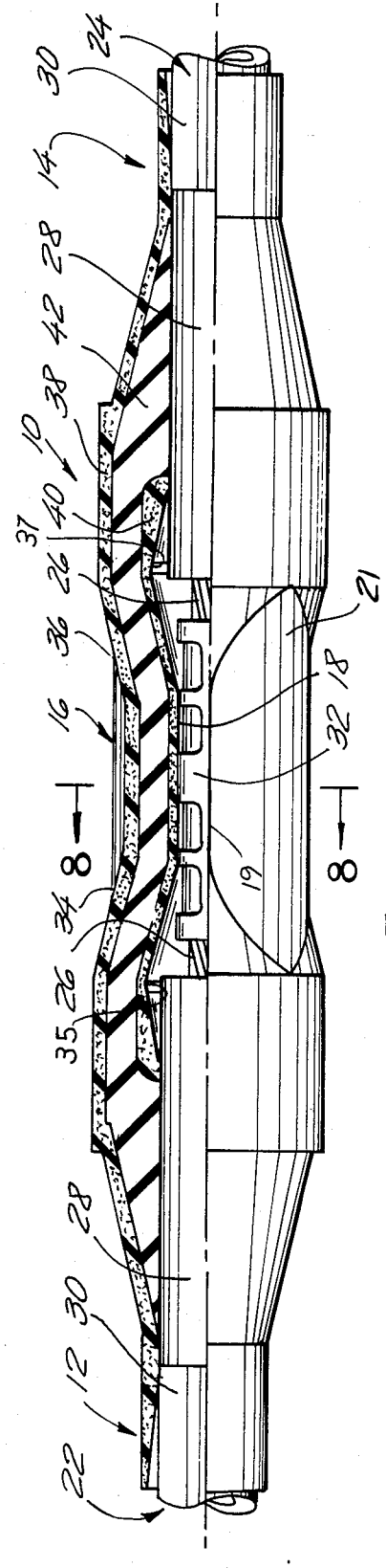

SPLICE CONNECTOR HOUSING AND ASSEMBLY OF CABLES EMPLOYING SAME

RELATED APPLICATION

U.S. design patent application Ser. No. 434,965 filed Oct. 18, 1982 is directed to the design aspects of the splice connector housing of the present application and is commonly assigned herewith.

BACKGROUND OF THE INVENTION

The invention relates to a permanent splice joint between two high voltage cables, each having inner conductors covered by insulation which is in turn covered by a semi-conductive shield.

It is now common to provide such a splice joint wherein the shield of each cable is stripped from the insulation for a predetermined distance from the cable end and the insulation is stripped from the inner conductor a lesser predetermined distance from the cable end, to expose the inner conductor, the conductors of the two cables then being inserted into opposite ends of a compression connector which is thereupon crimped to the conductors, thus to join the same mechanically and electrically. The splice joint is completed by a known one piece housing comprising a tubular elastomeric sleeve having first and second coaxial end portions for receiving and gripping the insulation and shield of each of the first and second cables, and, between and joining the end portions a cylindrical central portion coaxial with the end portions for receiving and engaging the compression connector crimped to the inner conductors of the cables.

A splice joint utilizing the known housing is fashioned by preparing the cables as aforesaid, forcing the one piece known housing completely onto and over the shield of one of the cables, inserting the inner conductors of the cables into opposite ends of the compression connector, crimping the compression connector to the conductors and finally forcing the known housing in the direction opposite that in which it was forced to position it upon one of the cables, onto the other of said cables until one of the housing end portions grips the insulation and shield of the other one of said cables and the cylindrical central portion engages the compression connector.

The known housing is a unitary, composite structure. The outer surface of the housing from one end to the other is provided by an outer layer of semi-conductive rubber, the inner surface of the housing in the central portion is provided by an inner layer of semi-conductive rubber, which, in the completed splice joint engages the cable shields of both cables and the compression connector respectively for known electrical reasons and heat dissipation. The known housing further includes an intermediate layer of nonconductive rubber joined to the outer layer and the inner layer. In the completed splice joint, the inner surface of the intermediate layer of insulating material grips the insulation of both cables while the outer layer of semi-conductive rubber grips the insulation and the shield of both cables.

It is considered desirable that each size splice housing be able to be employed with a wide range of cable diameters. However, two competing factors have to be reconciled in order that the housing be functional. In order that adequate contact be made between the compression connector and the inner layer of semi-conductive rubber, the bore of the housing must be made small, but to permit ease of installation of the housing and to permit use of the housing with a wide range of cable diameters, the bore must be made large. Too small a bore and the frictional forces will prevent movement of the housing with respect to the cable. Too large a bore will ease installation of the housing over the cable shield but limit contact with the compression connector.

Various attempts have been made to ameliorate this disadvantage. Among these attempts are those of U.S. Pat. No. 3,673,311 issued on June 27, 1972 to Misare which eliminated the contact between the compression connector and the inner layer of semi-con of the housing and substituted a centrally located conductive filler which engaged to compression connector along a part of its outer periphery and U.S. Pat. No. 4,054,743 issued Oct. 18, 1977 to Mayer et al. which employs air pressure and an air cushion to reduce the gripping force of the housing until it is properly placed over the compression connector and in contact with the cables to be joined. One manufacturer uses a single size splice housing and varies the outside diameter of his compression connector for each cable size within that housing's range. A number of such housings and associated compression connectors are required. However, the frictional forces encountered during assembly are still great, and one needs a separate compression connector for each cable size and each housing size.

The present invention solves the problems as above set forth by providing a housing with sufficient inherent flexibility to make it feasible to slide the housing onto one of the cables to be joined and then to slide it to its final position, even where the cables are of the largest diameter intended for use with the inventive housing, an advantage which is attained while still obtaining sufficient electrical and mechanical engagement of the inner semi-conductive rubber layer with the compression connector.

Viewed from another prespective, a particular inventive housing can be used with a greater range of cable sizes than was possible with the known housing, thus reducing the number of different housings required. It is therefore an object of this invention to provide an improved splice housing.

It is an object of this invention to provide a splice housing which can be used with a wide range of cable sizes.

It is therefore an important object of the invention to provide an improved splice housing of substantially increased flexibility, thus making much easier the completion of splice joints by reducing assembly forces.

It is a further object to provide such an improved housing which does not sacrifice electrical or heat dissipating continuity.

It is an additional object to provide such an improved housing which is useful with cables of increased diameter ranges, with respect to the known housing. Other objects and features of the invention will be pointed out in the following description and claims and illustrated in the accompanying drawings, which disclose and illustrate, by way of example, the principles of the invention and the best mode which has been contemplated for carrying it out.

SUMMARY OF THE INVENTION

The present invention is a splice housing, and a completed splice joint utilizing the housing, wherein a housing comprises a tubular elastomeric sleeve having first and second coaxial end portions which receive the insulation and shield of first and second high voltage cables, respectively, and, between the end portions, a central portion coaxial with the end portions and of substantially uniform wall thickness. The central portion receives and resiliently engages a compression connector crimped to the inner conductors of the cables. The central portion further has a plurality of circumferentially spaced similar radially resiliently dilatable inner areas the inner surfaces of which define a circle normally of lesser diameter than both the cable insulation and the compression connector and a like number of circumferentially spaced similar relieved outer areas the inner surfaces of which define a circle of greater diameter than that of the cable shield. Each outer area merges smoothly circumferentially with two inner areas.

The preferred form of splice housing employs four inner areas although more or less number of inner areas can be employed. For example, a single inner area could be used if it were configured to give required contact and thermal performance. Five or more inner areas could also be used, except that as the number of inner areas increases, the tooling required becomes increasingly complex. For purposes of this disclosure, it will be assumed that four inner areas are employed.

The housing further has a first transition portion longitudinally between the central portion and the first end portion and a second transition portion longitudinally between the central portion and the second end portion and the central portion merges with both transition portions and the first and second transition portions merge with the first and second end portions, respectively, and each transition portion has a location where its inner surface is of larger diameter than the cable shield and the inner areas and the outer areas of the central portion run out at the transition portions.

Further, the housing is a unitary, composite structure wherein the outer surface of the housing from end to end thereof comprises an outer layer of semi-conductive rubber, the inner surface of the housing in the central portion and the transition portions comprises an inner layer of semi-conductive rubber and the housing further comprises an intermediate layer of insulating rubber joined to the outer layer and the inner layer. The inner surface of the central portions and the transition portions is provided by the inner layer, the inner surface of the housing for a predetermined distance from each end of the housing toward the longitudinal center thereof is provided by the outer layer and the remainder of the inner surface of the housing is provided by the intermediate layer.

DESCRIPTION OF THE DRAWING

The invention will be described with reference to the accompanying drawing in which:

FIG. 1 is a side elevation of a splice housing embodying the invention;

FIG. 2 is a side elevation, in section, taken along the line 2—2 of FIG. 1;

FIG. 5 is an axial section of the splice housing after placement completely on the first cable of first and second cables to be spliced, showing also an exposed compression connector into one end of which the inner conductor of the first cable has been inserted;

FIG. 7 is a side elevation, partly in section, of a completed splice, showing the housing located in final position on the first and second cables, the compression connector having been crimped to the inner conductors of the cables.

DESCRIPTION OF THE PREFERRED EMBODIMENT

Figure 3:
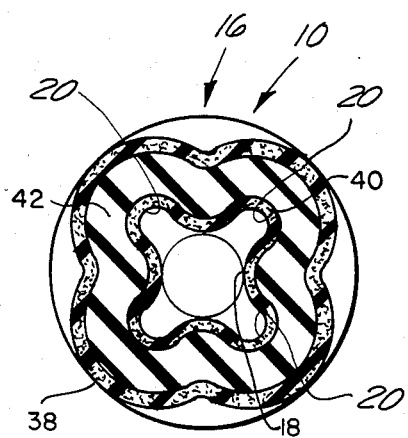
FIG. 3 is an end elevation in section, taken along the line 3—3 of FIG. 2.
Figure 4:
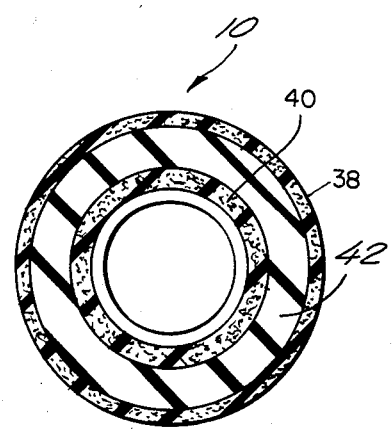
FIG. 4 is an end elevation, in section, taken along the line 4—4 of FIG. 2.

FIGS. 1, 2, 3 and 4 show a splice connector housing 10 comprising a tubular elastomeric sleeve having first and second coaxial end portions 12 and 14, respectively, and between end portions 12 and 14 a central portion 16 coaxial with end portions 12 and 14 and of substantially uniform wall thickness. Central portion 16 has a bore therethrough defined by a plurality of circumferentially spaced similar radially resiliently dilatable inner areas 18 and a like number of circumferentially spaced similar relieved outer areas 20, each of which merges smoothly circumferentially with two inner areas 18.

FIG. 7 shows an axial section of a completed splice joint, in which housing 10 is in final position on first and second cables 22 and 24, respectively, each having inner conductors 26 covered by insulation 28, which is in turn covered by a semi-conductive shield 30. Each shield 30 is stripped from its underlying insulation 28 a predetermined distance from the cable end and insulation 28 is stripped from inner conductors 26 a lesser predetermined distance from the cable end, to expose conductors 26 of cables 22 and 24, conductors 26 then being inserted into opposite ends of a compression connector 32 which is crimped to inner conductors 26, thus to join the same mechanically and electrically. As further shown in FIG. 7, end portions 12 and 14 contain and resiliently grip insulation 28 and shield 30 of cables 22 and 24, respectively, while central portion 16 contains and resiliently grips compression connector 32. It will be appreciated that the inner surfaces of inner areas 18 define a circle normally of lesser diameter than both cable insulation 28 and compression connector 32 and the inner surfaces of outer areas 20 define a circle of greater diameter than cable shield 30.

Also, it will be noted that the wall of the central housing portion 16 presents a lobular or ball-flower or quatrefoil-like configuration in sections perpendicular to the axis of housing 10.

It will be noted that housing 10 is at least substantially symmetrical on both sides of a plane perpendicular to the axis of housing 10 at the longitudinal midpoint of housing 10, and that said plane passes through the longitudinal midpoint of central portion 16.

Furthermore, each outer area 20 is substantially centered between those two inner areas 18 with which it merges, each inner area 18 is substantially symmetrical with respect to an axial plane passing through its circumferential center, and each outer area 20 is likewise substantially symmetrical with respect to an axial plane passing through its circumferential center.

Inner areas 18 provide housing 10 with internal longitudinal ribs and external grooves 19 and outer areas 20 provide housing 10 with internal longitudinal grooves and external longitudinal ribs 21.

Housing 10 further has a first transition portion 34 (see FIGS. 1, 2, 5 and 7 longitudinally between central portion 16 and first end portion 12 and a second transition portion 36 longitudinally between central portion 16 and second end portion 14. Central portion 16 merges with both transition portions 34 and 36. Transition portion 34 merges with end portion 12 and transition portion 36 merges with end portion 14. Each of transition portions 34 and 36 has a location 35 and 37, respectively, where its inner surface is of larger diameter than cable shield 30 and inner areas 18. Outer areas 20 of central portion 16 run out at transition portions 34 and 36.

Central portion 16 is of substantially constant normal configuration for a predetermined distance on each side of a plane perpendicular to the axis of housing 10 at the longitudinal midpoint of housing 10.

To describe housing 10 further, it is a unitary, composite structure. The outer surface of housing 10 from one end to the other comprises an outer layer 38 of semi-conductive rubber. The inner surface of housing 10 in central portion 16 and transition portions 34 and 36 comprises an inner layer 40 of semi-conductive rubber. Finally, housing 10 comprises an intermediate layer 42 of insulating rubber joined to outer layer 38 and inner layer 40. The inner surface of central portion 16 and transition portions 34 and 36 is provided by inner layer 40, the inner surface of housing 10 for a predetermined distance from each end of housing 10 toward the longitudinal center thereof is provided by outer layer 38 and the remainder of the inner surface of housing 10 is provided by intermediate layer 42.

Figure 6:
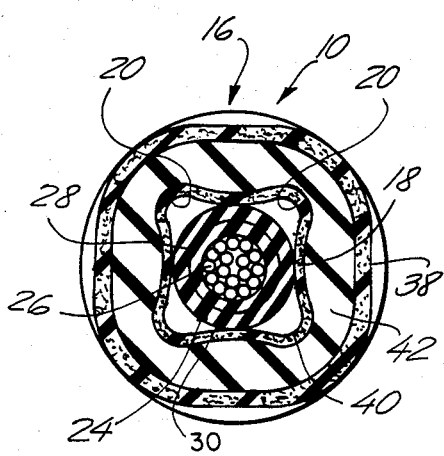
FIG. 6 is an end elevation, in section, taken along the line 6—6 of FIG. 5.
Figure 8:
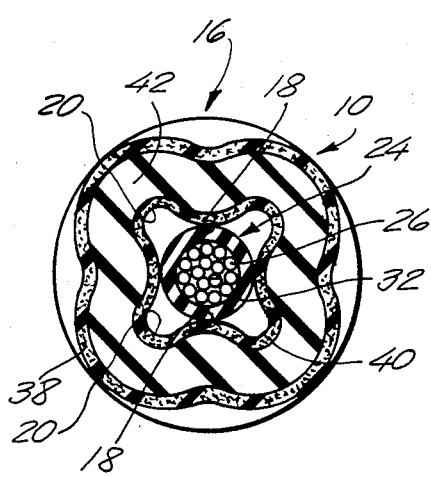
FIG. 8 is an end elevation, in section, taken along the line 8—8 of FIG. 7.

A completed splice joint utilizing housing 10 is formed in the manner indicated above and, when completed, inner areas 18 are resiliently dilated to grip compression connector 32, as revealed by a comparison of FIGS. 3 and 8. When housing 10 is completely on cable 24, as shown in FIG. 5, inner areas 18 are resiliently dilated to the diameter of the cable shield 30 and thus to a greater extent than when they later grip crimp barrel 32, as revealed by a comparison of FIGS. 6 and 8.

The ease with which these dilations are achieved is made possible by two types of flexibility which are built into housing 10. The first is provided by the circumferentially alternating inner and outer areas 18 and 20, respectively. The second provided by the fact that inner and outer areas run out at transition portions 34 and 36.

The invention is well adapted to the attainment of the foregoing objects and advantages as well as others.

The foregoing description of the invention is by way of example only, the scope of the invention being defined by the following claims.

The embodiments of the invention in which an exclusive right or privilege is claimed are as follows:

1. A housing for use in completing a splice connection between first and second electrical power cables, the cables each having an outside diameter and including an inner conductor and a cable jacket surrounding the inner conductor, the cable jacket including insulation around the conductor and a shield around the insulation, the splice connection including a connector element joining together bared portions of the inner conductors of the cables, the connector element having a diameter smaller than the outside diameter of each cable, the housing comprising:

a tubular elastomeric sleeve having opposite ends;
first and second coaxial end portions adjacent the corresponding ends of the sleeve, each end portion including an end portion bore extending axially through the respective end portion and having an inside diameter generally complementary to the outside diameter of a corresponding cable over which the end portion is to be placed;
a central portion located between the first and second end portions and coaxial therewith, the central portion including an axially-extending wall of essentially uniform wall thickness, said wall having an inside surface with circumferentially alternating inner and outer surface areas merging circumferentially smoothly with one another along said inside surface, each inner surface area extending radially inwardly to an inner position located radially inwardly of the inside diameter of each end portion bore, and each outer surface area extending radially outwardly to an outer position located radially outwardly of the inside diameter of each end portion bore; and
transition portions located between each end portion and the central portion for enabling resilient radial flexing of the wall of the central portion to move each inner surface area resiliently outwardly and inwardly relative to the end portions, between said inner and outer positions, in response to movement of the sleeve in axial directions along a cable such that each inner surface area is movable resiliently radially between engagement with the corresponding cable jacket and engagement with the connector element.

2. The invention of claim 1 including a plurality of inner surface areas and a corresponding plurality of outer surface areas.

3. The invention of claim 2 wherein the inner surface areas lie on a circle having a diameter smaller than the inside diameter of each end portion bore and the outer surface areas lie on a circle having a diameter greater than the inside diameter of each end portion bore.

4. The invention of claim 3 wherein the wall of said central portion presents a lobular configuration in sections perpendicular to the axial direction.

5. The invention of claim 3 wherein the sleeve is substantially symmetrical with respect to a plane perpendicular to the axial direction and passing through the longitudinal midpoint of the sleeve.

6. The invention of claim 5 wherein the central portion is of essentially constant normal configuration for a predetermined distance on each side of said plane.

7. The invention of claim 3 including four inner surface areas and four outer surface areas.

8. The invention of claim 7 wherein the wall of said central portion presents a ball-flowerlike configuration in sections perpendicular to the axial direction.

9. The invention of claim 7 wherein the wall of said central portion presents a quatrefoil-like configuration in sections perpendicular to the axial direction.

10. The invention of claim 7 wherein the sleeve is substantially symmetrical with respect to a plane perpendicular to the axial direction and passing through the longitudinal midpoint of the sleeve.

11. The invention of claim 10 wherein the central portion is of essentially constant normal configuration for a predetermined distance on each side of said plane.

12. The invention of claim 3 wherein each inner surface area is substantially centered circumferentially between adjacent outer surface areas.

13. The invention of claim 12 wherein each inner surface area and each outer surface area is substantially symmetrical about a respective axial plane passing through the circumferential center of the respective surface area.

14. The invention of claim 3 wherein said inner surface areas provide said sleeve with internal longitudinal ribs and counterpart external grooves and said outer surface areas provide said sleeve with internal longitudinal grooves and counterpart external longitudinal ribs.

15. The invention of claim 3 wherein said transition portions include a first transition portion extending longitudinally between the central portion and the first end portion and a second transition portion extending longitudinally between the central portion and the second end portion, the central portion merging with the first and second transition portions and the first and second transition portions merging with the first and second end portions, respectively, each of said first and second transition portions including an inside surface of larger diameter than the inside diameter of a corresponding end portion bore, and the inner surface areas and the outer surface areas of the central portion run out at the transition portions.

16. The invention of claim 15 wherein the sleeve is a unitary, composite structure including an outer layer of semi-conductive elastomeric material extending from one to the other of said opposite ends, an inner layer of semi-conductive elastomeric material extending along the inside surface of the central portion and the inside surface of each transition portion, and an intermediate layer of insulating elastomeric material interposed between the outer layer and the inner layer.

17. In a splice connection between first and second electrical power cables, the cables each having an outside diameter and including an inner conductor and a cable jacket surrounding the inner conductor, the cable jacket including insulation around the conductor and a shield around the insulation, the splice connection including a connector element joining together bared portions of the inner conductors of the cables, the connector element having a diameter smaller than the outside diameter of each cable, a housing comprising:

a tubular elastomeric sleeve having opposite ends;

first and second coaxial end portions adjacent the corresponding ends of the sleeve, each end portion including an end portion bore extending axially through the respective end portion and having an inside diameter related to the outside diameter of a corresponding cable over which the end portion is placed such that the end portion bore is resiliently dilated to grip the cable;

a central portion located between the first and second end portions and coaxial therewith, the central portion including an axially-extending wall of essentially uniform wall thickness, said wall having an inside surface with circumferentially alternating inner and outer surface areas merging circumferentially smoothly with one another along said inside surface, each inner surface area extending radially inwardly to an inner position located radially inwardly of the inside diameter of each end portion bore, and each outer surface area extending radially outwardly to an outer position located radially outwardly of the inside diameter of each end portion bore; and transition portions located between each end portion and the central portion for enabling resilient radial flexing of the wall of central portion to move each inner surface areas resiliently outwardly and inwardly relative to the end portions such that each inner surface area is in resilient gripping engagement with the connector element.

\* \* \* \* \*